United States Patent
Goel et al.

(10) Patent No.: US 8,886,827 B2
(45) Date of Patent: Nov. 11, 2014

(54) FLOW CACHE MECHANISM FOR PERFORMING PACKET FLOW LOOKUPS IN A NETWORK DEVICE

(75) Inventors: Deepak Goel, Sunnyvale, CA (US); John Keen, Mountain View, CA (US); Venkatasubramanian Swaminathan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 72 days.

(21) Appl. No.: 13/372,014

(22) Filed: Feb. 13, 2012

(65) Prior Publication Data

US 2013/0212296 A1    Aug. 15, 2013

(51) Int. Cl.
    *G06F 15/173* (2006.01)
(52) U.S. Cl.
    USPC .................................................... 709/238
(58) Field of Classification Search
    CPC .. H04L 45/7453; H04L 45/742; H04L 45/748
    USPC .......... 709/238, 242; 370/230, 231, 232, 233, 370/234, 235
    See application file for complete search history.

(56) References Cited

U.S. PATENT DOCUMENTS

| | | | |
|---|---|---|---|
| 6,768,739 B1 | 7/2004 | Kobayashi et al. | |
| 7,730,207 B2 * | 6/2010 | Zhang et al. | 709/242 |
| 8,005,868 B2 | 8/2011 | Saborit et al. | |
| 8,018,940 B2 | 9/2011 | Hao et al. | |
| 2001/0028651 A1 | 10/2001 | Murase | |
| 2002/0046291 A1 * | 4/2002 | O'Callaghan et al. | 709/238 |
| 2003/0065812 A1 * | 4/2003 | Beier et al. | 709/236 |
| 2004/0085958 A1 * | 5/2004 | Oman | 370/389 |
| 2005/0195832 A1 | 9/2005 | Dharmapurikar et al. | |
| 2005/0219929 A1 * | 10/2005 | Navas | 365/212 |
| 2006/0184690 A1 * | 8/2006 | Milliken | 709/238 |

(Continued)

FOREIGN PATENT DOCUMENTS

| | | | |
|---|---|---|---|
| CN | 101150483 A | * | 3/2008 |
| CN | 101398820 A | * | 4/2009 |
| JP | 2008011448 A | * | 1/2008 |
| WO | 02076042 A1 | | 9/2002 |

OTHER PUBLICATIONS

Berenbrink et al., "Balanced Allocations: The Heavily Loaded Case," Siam J. Comput. vol. 35 No. 6, pp. 1350-1385, Aug. 2005.

(Continued)

*Primary Examiner* — Kostas Katsikis
(74) *Attorney, Agent, or Firm* — Shumaker & Sieffert, P.A.

(57) ABSTRACT

An example network device includes a network interface configured to receive a packet of a packet flow, wherein the packet flow is one of a plurality of packet flows processed by the network device, a flow cache configured to receive a lookup key associated with the packet flow, and a Bloom filter configured to process the lookup key. The flow cache is further configured to store information about a portion of the plurality of packet flows processed by the network device, and determine whether to store information about the packet flow by at least applying a selection criterion to processing of the lookup key by the Bloom filter. The flow cache is configured to determine whether the lookup key is stored in the flow cache, and, when the lookup key is stored in the flow cache, retrieve a stored result associated with the lookup key and output the stored result.

20 Claims, 7 Drawing Sheets

(56) References Cited

U.S. PATENT DOCUMENTS

| | | |
|---|---|---|
| 2007/0016666 A1* | 1/2007 | Duffield et al. .............. 709/223 |
| 2007/0136331 A1* | 6/2007 | Hasan et al. ................. 707/100 |
| 2007/0168550 A1* | 7/2007 | Wang et al. .................. 709/238 |
| 2008/0181217 A1* | 7/2008 | Sheppard et al. ............ 370/389 |
| 2009/0182726 A1 | 7/2009 | Wang |
| 2009/0228433 A1 | 9/2009 | Saborit et al. |
| 2010/0040066 A1 | 2/2010 | Hao et al. |
| 2010/0098081 A1 | 4/2010 | Dharmapurikar et al. |
| 2010/0118885 A1* | 5/2010 | Congdon ...................... 370/419 |
| 2010/0281150 A1* | 11/2010 | Sailhan et al. ................ 709/223 |
| 2010/0284405 A1 | 11/2010 | Lim |
| 2010/0290468 A1* | 11/2010 | Lynam et al. ................. 370/392 |
| 2011/0069632 A1* | 3/2011 | Chen et al. .................... 370/253 |
| 2012/0084459 A1* | 4/2012 | Wu et al. ....................... 709/238 |
| 2012/0117319 A1 | 5/2012 | Slavin |
| 2012/0136846 A1* | 5/2012 | Song et al. .................... 707/698 |
| 2012/0233349 A1* | 9/2012 | Aybay ........................... 709/234 |
| 2013/0031229 A1 | 1/2013 | Shiga et al. |

OTHER PUBLICATIONS

Kirsch et al., "More Robust Hashing: Cuckoo Hashing With a Stash," Siam J. Comput., vol. 39, 4, pp. 1543-1561, Oct. 2009.

Pagh et al., "Cuckoo Hashing," Preprint submitted to Elsevier Science Dec. 8, 2003, 27 pp.

Panigrahy, "Efficient Hashing with Lookups in two Memory Accesses," found at http://arxiv.org/PS_cache/cs/pdf/0407/0407023v1.pdf, Feb. 1, 2008, 12 pp.

Friedgut et al., "Every Monotone Graph Property Has a Sharp Threshold," American Mathematical Society vol. 124, No. 10, Oct. 1996. 10 pp.

Askitis, "Fast Compact Hash Tables for Integer Keys," presented at the 32nd Australasian Computer Science Conference (ACSC 2009), Wellington, New Zealand, Jan. 2009, 10 pp.

Dharmapurikar et al., "Longest Prefix Matching Using Bloom Filters," IEEE/ACM Transactions on Networking, vol. 14, No. 2, Apr. 2006, 13 pp.

Steger et al., "Balanced Allocations: The Heavily Loaded Case," Powerpoint Presentation, Institut fur Informatik Technische Universitat Munchen, Retrieved on Mar. 1, 2011, 14 pp.

Srinivasan et al, "Fast Address Lookups Using Controlled Prefix Expansion," ACM Transactions on Computer Systems, vol. 17 No. 1, Feb. 1999, 40 pp.

U.S. Appl. No. 12/425,517, by Arun Kumar S P et al., filed Apr. 17, 2009.

U.S. Appl. No. 13/239,915, by John Keen, filed Sep. 22, 2011.

U.S. Appl. No. 13/194,571, by Scott Mackie, filed Jul. 29, 2011.

Extended European Search Report mailed May 24, 2013 in corresponding EP Application No. 12199338.0, 7 pgs.

U.S. Appl. No. 13/239,774, by John Keen, filed Sep. 22, 2011.

Response filed Feb. 12, 2014 to the Extended European Search Report mailed May 24, 2013 in corresponding EP Application No. 12199338.0, 17 pgs.

* cited by examiner

FLOW CACHE MECHANISM FOR PERFORMING PACKET FLOW LOOKUPS IN A NETWORK DEVICE

TECHNICAL FIELD

This disclosure relates to computer networks and, more particularly, to forwarding traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are transmitted between the source device and destination device using intermediate network devices, such as gateways, firewalls, switches and routers. When a network receives an incoming packet or sends an outgoing packet, the network device may apply one or more filters to the packet to perform a defined action on the packet under certain conditions. In order to identify the terms of the filters to apply to a given packet, the network device may extract information from the packet, such as a source or destination Internet Protocol (IP) address, a source or destination port, and protocol. The network device then performs a search of the filter terms installed within the network device to determine whether the extracted information satisfies criteria specified by any of the filter terms.

One conventional approach to identifying matching filter terms to apply to packets includes applying a hash function to at least a portion of the extracted information (i.e., a key) to determine possible locations in a hash table for the extracted information. A key corresponds to a portion of the extracted information having a predefined length (e.g., a prefix of a source or destination IP address). That is, one or more keys are inputted into a hash function to generate one or more possible locations in a hash table. The network device then looks up each possible location in the hash table to determine if the key is found in any of the possible locations. A key is found in the hash table when one or more filter terms are defined for the possible location. According to a longest prefix match algorithm, the router applies the filter terms associated with the longest prefix for which a match is found for the corresponding key in the hash table. Performing the lookup for each key in the hash table is done serially, such that each possible location for the extracted information is looked up in the hash table one location at a time.

In order to improve the speed at which the network device identifies filter terms to apply to the packets, the network device may be configured to minimize the number of lookups in the hash table. In some cases, the network device may utilize a Bloom filter as an initial assessment of whether the key is affirmatively not present within the hash table or, alternatively, whether the key may possibly be stored in the hash table. In this way, the Bloom filter may provide an efficient mechanism for avoiding computationally expensive searches of a hash table when the key is affirmatively not present within the hash table. Conventionally, the Bloom filter is implemented as a bit array that stores one 1-bit value at each entry of the array, where each 1-bit entry may correspond to a different "bucket" of a corresponding hash table and indicate that at least one entry in the hash table exists for that particular "bucket." When the Bloom filter is implemented in hardware (e.g., when the bit array is stored in multiple memory banks), the network device may perform a look up for multiple keys in the Bloom filter in parallel, reducing the total number of clock cycles required to look up all of the keys generated for the extracted information. However, when a large number of search keys all require reads from the same memory bank, the queue for the memory bank may become full and force the scheduling component of the router to stall, so that the scheduler cannot issue lookup requests to any of the memory banks of the Bloom filter until the queue is no longer full. Thus, the memory bank having the full queue may be a bottleneck that limits the overall throughput of the Bloom filter lookups and operation of the network device.

SUMMARY

In general, techniques are described for identifying packet flows that are limiting overall throughput of the network device and selectively storing information about the problematic packet flows in a cache unit of a network device. A network device is described in which the network device may be programmatically configured to identify packet flows eligible for storage within the cache based on configurable parameters and selectively store information about the eligible packet flows. For example, in accordance with techniques of this disclosure, a flow cache may be programmatically configured to identify packets flows as eligible for being stored in the cache based at least in part on a number of hash table lookups required and/or the amount of time required (e.g., a number of clock cycles) to service a request belonging to the flow. The flow cache may then be programmatically configured to determine whether the packet flow information identified as eligible for being stored in the flow cache is stored in the flow cache and where the information is stored in the flow cache.

In one example, a method includes receiving, with a flow cache of a network device, a lookup key associated with a packet flow, wherein the packet flow is one of a plurality of packet flows processed by the network device, wherein the flow cache stores information about a portion of the plurality of packet flows processed by the network device, and wherein the flow cache determines whether to store information about the packet flow by at least applying a selection criterion to processing of the lookup key by a Bloom filter of the network device. The method further includes determining, with the flow cache, whether the lookup key is stored in the flow cache, and, when the lookup key is stored in the flow cache, retrieving, with the flow cache, a stored result associated with the lookup key, and outputting the stored result.

In another example, a network device includes a network interface configured to receive a packet of a packet flow, wherein the packet flow is one of a plurality of packet flows processed by the network device, a flow cache configured to receive a lookup key associated with the packet flow, and a Bloom filter configured to process the lookup key. The flow cache is further configured to store information about a portion of the plurality of packet flows processed by the network device, and determine whether to store information about the packet flow by at least applying a selection criterion to processing of the lookup key by the Bloom filter. The flow cache is configured to determine whether the lookup key is stored in the flow cache, and, when the lookup key is stored in the flow cache, retrieve a stored result associated with the lookup key and output the stored result.

In another example, a computer-readable storage medium is encoded with instructions for causing one or more programmable processors of a computing device to receive a lookup key associated with a packet flow, wherein the packet flow is one of a plurality of packet flows processed by the computing device, wherein a flow cache of the computing device stores information about a portion of the plurality of packet flows processed by the network device, and wherein the flow cache determines whether to store information about the packet flow based at least in part on applying a selection criterion to processing of the lookup key by a Bloom filter of the network device. The instructions further cause the one or more programmable processors to determine whether the lookup key is stored in the flow cache, and, when the lookup key is stored in the flow cache, retrieve a stored result associated with the lookup key, and output the stored result.

The techniques of this disclosure may provide several advantages. For example, the techniques provide programmatic control over a controller and a flow cache in a way that allows software to configure the manner in which a caching mechanism is implemented on a particular device. This may allow the caching mechanism to be tailored to the particular environment in which the network device is deployed. Selectively storing information about packet flows based at least in part on a number of hash table lookups required and/or the amount of time required (e.g., a number of clock cycles) may increase the throughput and performance of a network device as compared to conventional methods of processing packet flows using a Bloom filter and key hash table. The increase in throughput that may result from implementing the techniques of this disclosure may be the greatest when a large number of packet flows share the same destination network address or a few different destination network addresses. Furthermore, techniques of this disclosure may enable a network device to identify and cache information about the packet flows most likely to impact the performance of the network device. Limiting the caching of packet flow information to those most likely to impact the performance may reduce the size of the cache that is required to increase performance, reducing hardware costs.

The details of one or more examples are set forth in the accompanying drawings and the description below. Other features, objects, and advantages will be apparent from the description and drawings, and from the claims.

DETAILED DESCRIPTION

Figure 1:
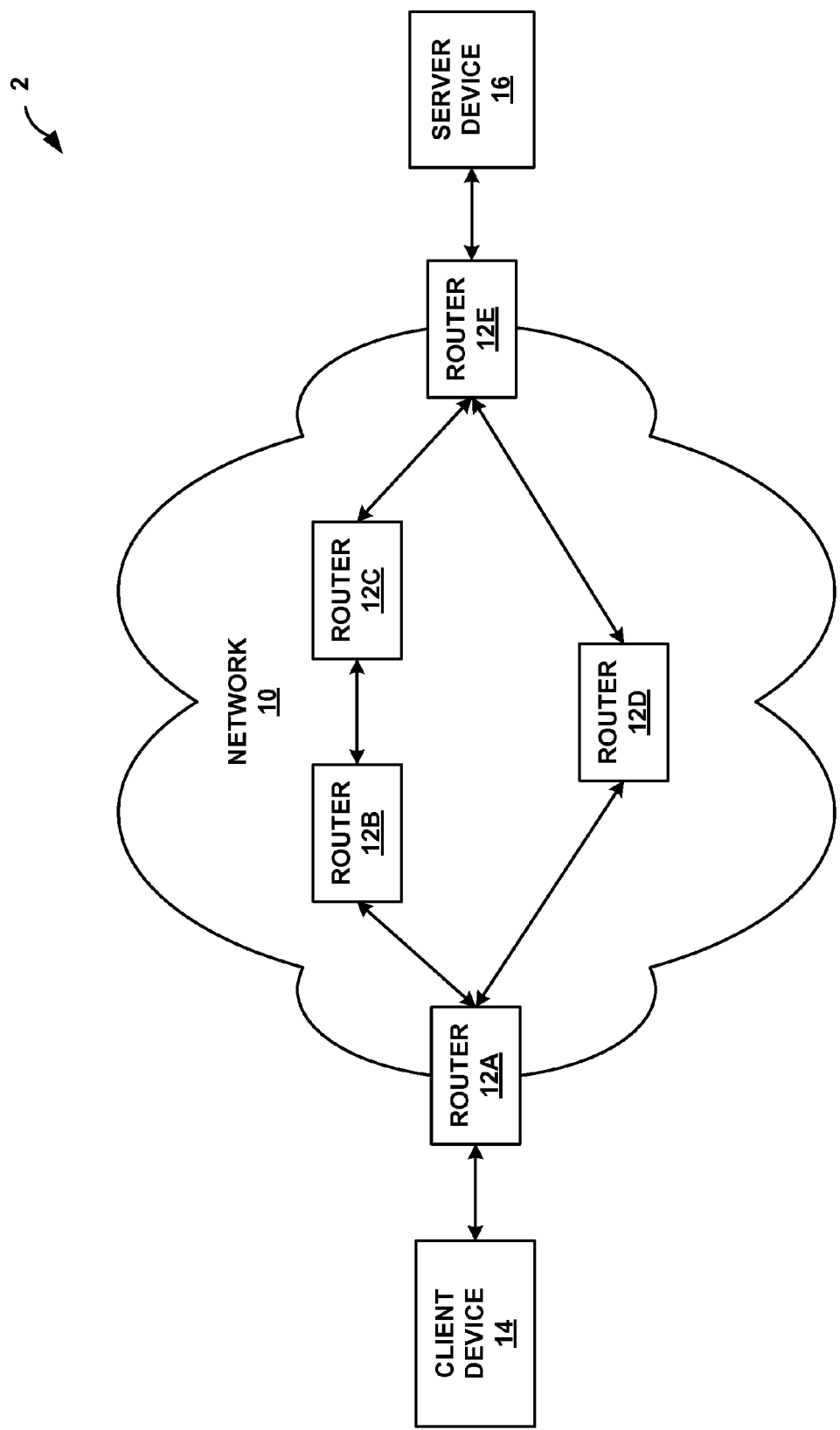
FIG. 1 is a block diagram illustrating an example system including a variety of network devices, any of which may implement the techniques of this disclosure.

FIG. 1 is a block diagram illustrating an example system 2 that includes a variety of network devices, any of which may implement the techniques of this disclosure. As illustrated in FIG. 1, system 2 includes network 10, client device 14, and server device 16. Network 10 includes routers 12A-12E (collectively, "routers 12") that facilitate the access of content between various network devices connected to network 10, including client device 14 and server device 16. While illustrated as including routers 12, in other examples, system 2 may include additional or alternative network devices, such as gateways, switches, hubs, firewall, intrusion detection/prevention (IDP) devices, and/or any other type of networking equipment or device that facilitates the transfer of data between the various network devices. Although described with respect to a router or other network device, any device that includes a hash table and one or more Bloom filters may implement the techniques described herein and the techniques should not be limited to routers or other network devices.

Network 10 enables transmission of content between network devices using one or more packet-based protocols, such as a Transmission Control Protocol/Internet Protocol (TCP/IP). In this respect network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client. Client device 14 may represent an endpoint device, such as a mobile device (e.g., a laptop computer, tablet computer, or cellular phone), a personal computer, a computing terminal, an Internet-capable television or device for providing Internet-based television services, or other such devices. Server device 16 may represent a web server, a file server, a peer device (e.g., another user's computing device), a database server, a print server, or other device from which a client device requests services.

Client device 14 submits requests to server device 16 via network 10. In the example illustrated in FIG. 1, client device 14 is communicatively coupled to router 12A. In other examples, client device 14 may be communicatively coupled to router 12A via additional network devices, such as access lines, wireless infrastructure and backhaul networks, and the like. Routers 12 of network 10 are configured to determine routes through network 10 to reach various destinations, such as server device 16. Routers 12 implement routing protocols to determine routes through network 10, as well as to share determined routes with other routers 12. In the example of FIG. 1, router 12A determines that two routes exist to reach server device 16. A first route beginning at router 12A to reach server device 16 includes router 12D, router 12E, and server device 16. A second route beginning at router 12A to reach server device 16 includes router 12B, router 12C, router 12E, and server device 16. In general, router 12A includes a control plane that executes routing protocols to learn the topology of network 10 and to select one of these routes over the other. Upon receiving data from client device 14 destined for server device 16, a data plane of router 12A performs a lookup function on keying information within the packet and forwards the data along the selected route.

Prior to forwarding a packet, routers 12 may apply one or more filters to the packet. In some examples, filters specify one or more conditions and a set of actions to be performed on packets that match the conditions. In various examples, the conditions specify one or more of a source Internet protocol (IP) address, a destination IP address, a source port, a destination port, a protocol, and/or other fields of a packet. The actions to perform may include one or more of appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

In some examples, the data plane implements a longest prefix match algorithm when forwarding an individual packet to identify one or more filters to apply to the packet. For example, the filters may be stored in a filter table and specify criteria to be matched against the packet, such as network prefix. Collectively, the criteria specified by the filters control which of the filters are to be applied to the packet by the data plane. As one example, router 12A may not necessarily be configured with a specific source or destination network address of an individual server device 16 (e.g., 10.1.1.8), but instead may be configured such that packets having a source or destination address matching a certain prefix (e.g., a range of addresses corresponding to the network prefix 10.1/16) are to have a certain filter applied to the packets by router 12A. In general, the data plane of router 12A uses the longest prefix match algorithm to identify the entry in the filter table that corresponds to the longest prefix that matches the key information of a received packet. Router 12A applies the set of filters specified in the entry of the filter table identified as storing the longest matching prefix that is satisfied by the key information of the received packet.

Routers 12, in some examples, use hashing units to identify filters that match a particular packet. In one example, the hashing unit supports prefix lengths (which act as key values in the hashing unit) from /0 to /128. Prefixes with lengths from /0 to /64, in some examples, consume a single cell of a bucket of the hashing unit, while prefixes with prefix lengths from /65 to /128 consume two consecutive cells, referred to as a double cell, in the hashing unit. Hash tables of the hashing unit, in some examples, physically support 64K single cells, with two cells per bucket. In some examples, if all prefixes are of single cells, each hash table can support loads of approximately 80% to 90% (e.g., 51,000 to 57,600 entries). In some examples, if all prefixes are of double cells, each hash table of the hashing unit can support loads of approximately 40% to 45% (e.g., 28,800 entries). The physical hash tables of a hashing unit may be referred to as key hash tables. In some examples, each key hash table has a capacity of approximately 16K cells and associated results. One example implementation of a hashing unit and corresponding hash tables is described by U.S. patent application Ser. No. 13/239,774, entitled "DYNAMICALLY ADJUSTING HASH TABLE CAPACITY," by Keen et al., filed Sep. 22, 2011, which is hereby incorporated by reference in its entirety.

When adding a value to the key hash table, the hashing unit stores the key value and an associated value in one of the cells of the bucket to which the key value maps. For example, with respect to the filters of router 12A, different length prefixes of source or destination network addresses act as key values, while associated values each represent the particular terms of the filter that match a particular key value. Accordingly, router 12A stores a destination address and an associated value in a cell of a bucket to which a hash function maps the destination address. The associated value may specify a network interface or particular terms of a filter that matches the destination address. By storing the prefixes in the cell, if two or more prefixes are mapped to the same bucket, router 12A can determine which of the cells stores the value associated with a particular length prefix.

In some examples, router 12A includes multiple hashing units to implement a Bloom filter. A Bloom filter is generally a data structure for storing an indication of whether a particular value has been stored (or been previously processed). In one example, a Bloom filter is a bit array that stores one 1-bit value at each entry of the array. The Bloom filter data structure is generally designed such that false negatives are avoided, while leaving open the (albeit small) possibility of false positives. That is, a well-designed Bloom filter can provide an indication of whether a particular value has not been stored, but in some cases may provide an incorrect indication that the value has been stored (when in fact, the value has not been stored).

When router 12A stores a key value in, e.g., the key hash table, router 12A adds the key value to the Bloom filter. In general, when a Bloom filter is queried with a particular value, the Bloom filter provides an indication of whether the value is stored in the Bloom filter. In one example, the lookup returns the value one if the particular value is stored in the Bloom filter and returns the value zero if the particular value is not stored in the Bloom filter. While false positives are possible when using a Bloom filter, false negatives are typically not possible, due to the design of the Bloom filter. Therefore, upon receiving a key value comprising a prefix of a source or destination address for a packet, router 12A first determines whether the key value is stored in the Bloom filter, and if so, determines whether the key value is actually stored in the key hash table.

In some examples, the Bloom filter may be implemented in hardware (e.g., when the bit array is stored in multiple memory banks) or in software. When implemented in hardware, router 12A may perform a look up for multiple keys in parallel, which may reduce the total number of clock cycles required to look up the keys. However, when a large number of search keys all require reads from the same memory bank (e.g., when there are a large number of packet flows directed to the same destination network address), a queue for the memory bank may become full, preventing additional lookup requests from being issued to any of the memory banks of the Bloom filter until the queue is no longer full. Thus, the memory bank having the full queue may be a bottleneck that limits the overall throughput of the Bloom filter lookups and the router. The memory bank having the full queue may be referred to as a "hot bank" in this disclosure. While described with respect to a Bloom filter, techniques of this disclosure may be applied to any memory structure, such as a hardware-implemented hash table. A large number of reads may be required from the same memory bank of any memory structure. Thus, any memory structure may suffer from "hot banking" that may limit the overall throughput of the memory structure.

In accordance with the techniques of this disclosure, router 12A may identify packet flows that require more than a configurable threshold number of clock cycles to process or that require more than a configurable threshold number of lookups in the key hash table. Router 12A is configured with a scheduling element that manages the lookup requests for the Bloom filter. When a queue of a Bloom filter is full, the scheduling element may not direct additional keys to the queue, thereby increasing the number of clock cycles required to process a key. Once the key is processed and a result is retrieved from the key hash table, a controller of router 12A determines the number of clock cycles that elapsed between when the packet information was first received by the filter lookup unit and when the result was retrieved from the key hash table. If the number of clock cycles exceeds a configurable threshold, the controller marks the packet flow information as being eligible for storage in a flow cache of router 12A. The controller may also determine the number of lookups in the key hash table that were required to determine that no match was found or to find a match and retrieve the result. When the number of lookups exceeds a configurable threshold number of lookups, the controller marks the packet flow information as being eligible for storage in the flow cache.

In some examples, both the number of clock cycles required to process the packet flow information and the number of lookups in the key hash table may exceed each respective configurable threshold. However, the controller may mark the packet flow information as eligible for storage in the flow cache when either threshold is exceeded. In various instances, router 12A may be configured to require both thresholds to be exceeded prior to the controller marking the packet flow information as being eligible to be stored in the flow cache. Typically, router 12A stores a destination network address and the result retrieved from the key hash table in the flow cache. However, router 12A may be configured to store any combination of key and result information. For example, router 12A may use a combination of a source network address and a destination network address as a key in the flow cache. In another example, router 12A may use a combination of a destination network address and a port number as a key in the flow cache.

When router 12A receives a subsequent packet or packet flow having the same key information (e.g., the same destination network address) as a previously processed packet, router 12A may first lookup the destination network address or other key in the flow cache. If the key is found in the flow cache, the controller may use the result associated with the key stored in the flow cache and bypass performing a lookup in the Bloom filter or the key hash table. In this manner, techniques of this disclosure may reduce the number of lookups performed in a Bloom filter and key hash table, thereby reducing the occurrence of hot banking and improving the throughput of the network device.

Though described primarily with respect to router 12A, it should be understood that the techniques of this disclosure may be implemented by any of routers 12, client device 14, service device 16, or any other computing device that would implement hashing functionality. Moreover, the techniques of this disclosure may be applied to other contexts and for other uses. For example, the techniques of this disclosure may also be applied by router 12A when performing packet lookup and forwarding. The data plane of router 12A may implement the longest prefix match algorithm when forwarding an individual packet to identify an entry of a forwarding information base (FIB) of the data plane that best matches the destination address of the packet. Router 12A, in various instances, stores the FIB in a hashing unit having a plurality of hash tables and implements one or more Bloom filters in conjunction with the hash tables. Router 12A may then apply techniques of this disclosure to programmatically configure the hashing unit of the FIB to dynamically bypass one or more of the Bloom filters.

Figure 2:
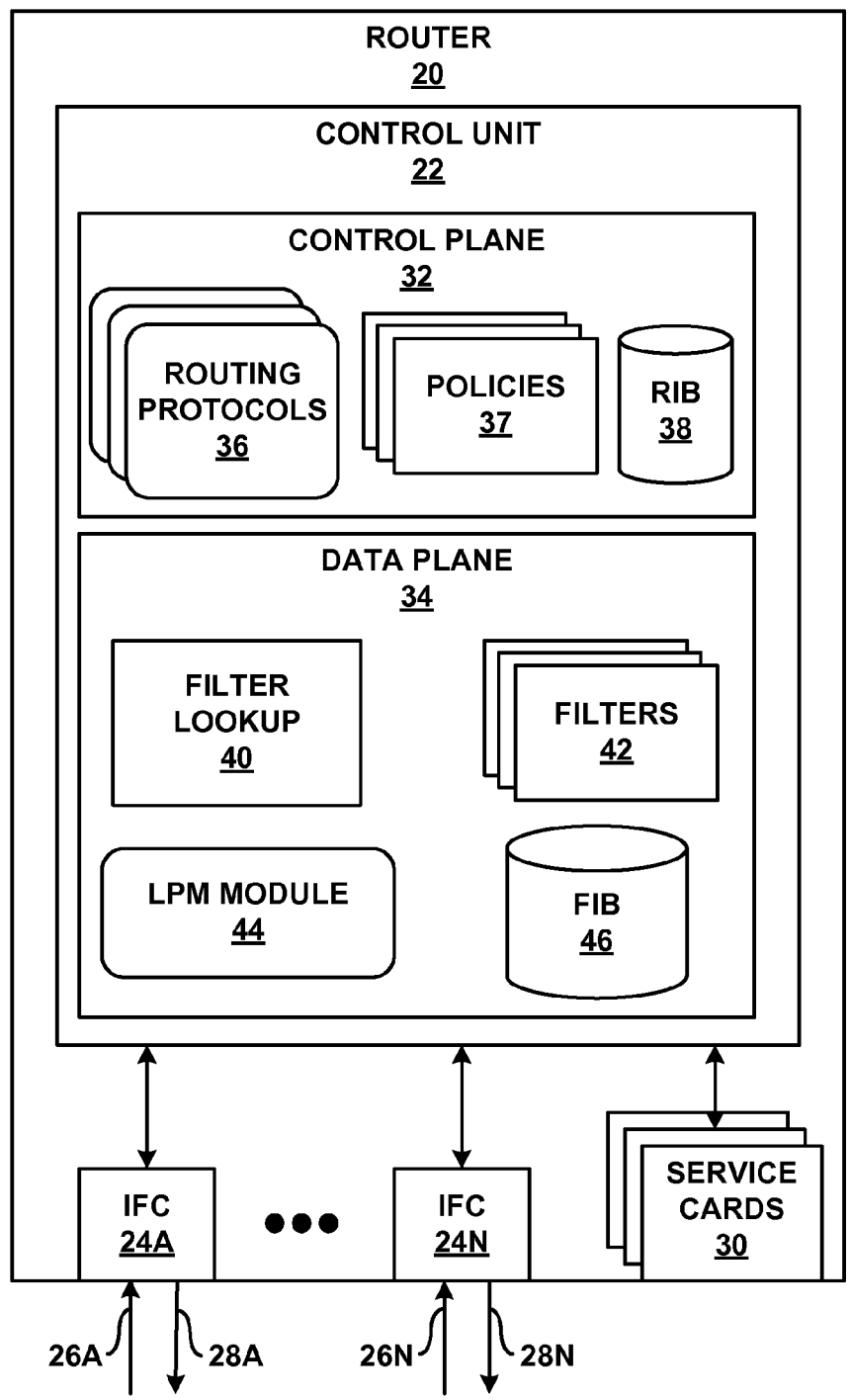
FIG. 2 is a block diagram illustrating an example router including a filter lookup block that is configured in accordance with one or more techniques of this disclosure.

FIG. 2 is a block diagram illustrating an example router 20 including a filter lookup block 40 that is configured in accordance with one or more techniques of this disclosure. For purposes of illustration, router 20 may be described below within the context of system 2 shown in the example of FIG. 1 and may represent any one of routers 12. In this example embodiment, router 20 includes control unit 22, interface cards (IFCs) 24A-24N (collectively, "IFCs 24"), and service cards 30.

Router 20 typically includes a chassis (not shown in the example of FIG. 2 for ease of illustration purposes) having a number of slots for receiving a set of cards, including IFCs 24 and service cards 30. Each card may be inserted into a corresponding slot of a chassis for communicably coupling the card to a control unit 22 via a bus, backplane, or other electrical communication mechanism. IFCs 24 send and receive packet flows or network traffic via inbound network links 26A-26N (collectively, "inbound links 26") and outbound network links 28A-28N (collectively, "outbound links 28"). Inbound links 26 and outbound links 28 in some examples for common IFCs form common, physical communication media for the IFCs, which operate in full duplex mode. That is, in some examples, each of IFCs 24 is coupled to respective communication media that can send and receive data substantially simultaneously. In other examples, inbound links 26 and outbound links 28 form separate physical media for respective IFCs 24.

Control unit 22 may include one or more processors (not shown in FIG. 2) that execute software instructions, such as those used to define a software or computer program, stored on a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 22 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 22 may also be divided into logical or physical "planes" to include a first control or routing plane 32, and a second data or forwarding plane 34. In some examples, control unit 22 may be further divided into a third logical or physical "plane," a service plane. That is, control unit 22 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

Control plane 32 of control unit 22 may provide the routing functionality of router 20. In this respect, control plane 32 may represent hardware or a combination of hardware and software of control unit 22 that implements routing protocols 36. Routing protocols 36 may include, for example, intermediate system to intermediate system (IS-IS), open shortest path first (OSPF), routing information protocol (RIP), border gateway protocol (BGP), or other routing protocols. By executing routing protocols 36, control plane 32 identifies existing routes through the network and determines new routes through the network. Control plane 32 stores routing information within routing information base (RIB) 38. The routing information may include information defining a topology of a network, such as network 10 of FIG. 1. Control plane 32 may resolve the topology defined by the routing information to select or determine one or more routes through network 10.

Control plane 32 may then update data plane 34 in accordance with these routes to program data plane 34 with forwarding information stored within forwarding information base (FIB) 46. The forwarding information associates keying information (e.g., IP addresses or IP prefixes or labels) with next hops (e.g., neighboring routers) and ultimately with output interfaces of router 20 coupled to outbound links 28. When forwarding a packet, data plane 34 processes a key extracted from the packet's header to traverse the forwarding information stored in FIB 46 and selects a next hop to which to forward the packet. Based on the selected next hop, data plane 34 identifies the set of one or more outbound links 28 that are coupled to the next hop.

Prior to forwarding a packet via one or more outbound links 28, data plane 34 may apply one or more filters to the packet. As illustrated in FIG. 2, data plane 34 includes a filter lookup block 40, filters 42, and a longest prefix match algorithm module (LPM MODULE) 44. Filters 42 include one or more filters defined for one or more different network address prefixes. In some examples, filters specify one or more conditions and a set of actions to be performed on packets that match the network address prefixes. The actions may include one or more of appending a label to the packet, removing or swapping a label on the packet, inspecting the packet for viruses, performing deep packet inspection on the packet, performing quality of service processing on the packet, blocking or dropping the packet or other services.

In general, longest prefix match algorithm module 44 implements the longest prefix match algorithm and is used by filter lookup block 40 to identify the terms of a filter 42 that match the network address for the longest defined prefix of the network address. According to the longest prefix match algorithm, a certain number of prefixes are generated from a network address. The number of prefixes generated from a network address may be configured by an administrator or may vary based on the type of network address used for the algorithm, as examples. In one example, sixteen or fewer prefixes, each having a different length, are generated based on the network address. One goal of the longest prefix match algorithm is to find the longest prefix having a match. In accordance with this goal, the hardware or software implementing the longest prefix match algorithm first performs a search for the longest prefix (i.e., the most specific prefix). If no match is found, a search is performed for the next longest prefix. This process is an iterative process that continues until a match is found or until a search has been performed for all possible prefixes.

Filter lookup block 40 stores the prefixes for which at least one filter is defined. In some examples, the prefix stored in filter lookup block 40 may be concatenated with the prefix length (e.g., the prefix 10.1 may be concatenated with the prefix length /16 for the entry "10.1/16" in filter lookup block 40). Filter lookup block 40 also generates a set of prefixes for each packet received by router 20 and searches for an associated value for each packet using the longest prefix match algorithm. That is, filter lookup block 40 performs searches on each of the generated prefixes, starting with the longest prefix and moving to the shortest prefix, in order, until a match is found. In one example, the longest prefix match may be performed by filter lookup block 40 on a source address (e.g., a source media access control address, a source IP address, or a source identifier) or a destination address (e.g., a destination media access control address, a destination IP address, or a destination identifier).

An administrator of router 20 may configure policies 37 that may be used by control plane 32 to programmatically configure the manner in which filter lookup block 40 performs the filter lookups. For example, control plane 32 may receive system performance information from data plane 34 that is reflective of the performance of filter lookup block 40. Based on policies 37 and the system performance information, control plane 32 configures filter lookup block 40 in a manner that, in various instances, may increase the performance of filter lookup block 40. That is, control plane 32 may select one of policies 37 to configure filter lookup block 40. One aspect of filter lookup block 40 configurable by control plane 32 includes the thresholds used by filter lookup block 40 to determine when a packet is eligible for storage in a flow cache of filter lookup block 40 and how filter lookup block 40 manages the information stored in the flow cache. Further details of filter lookup block 40 are described with respect to FIGS. 3-6.

Figure 3:
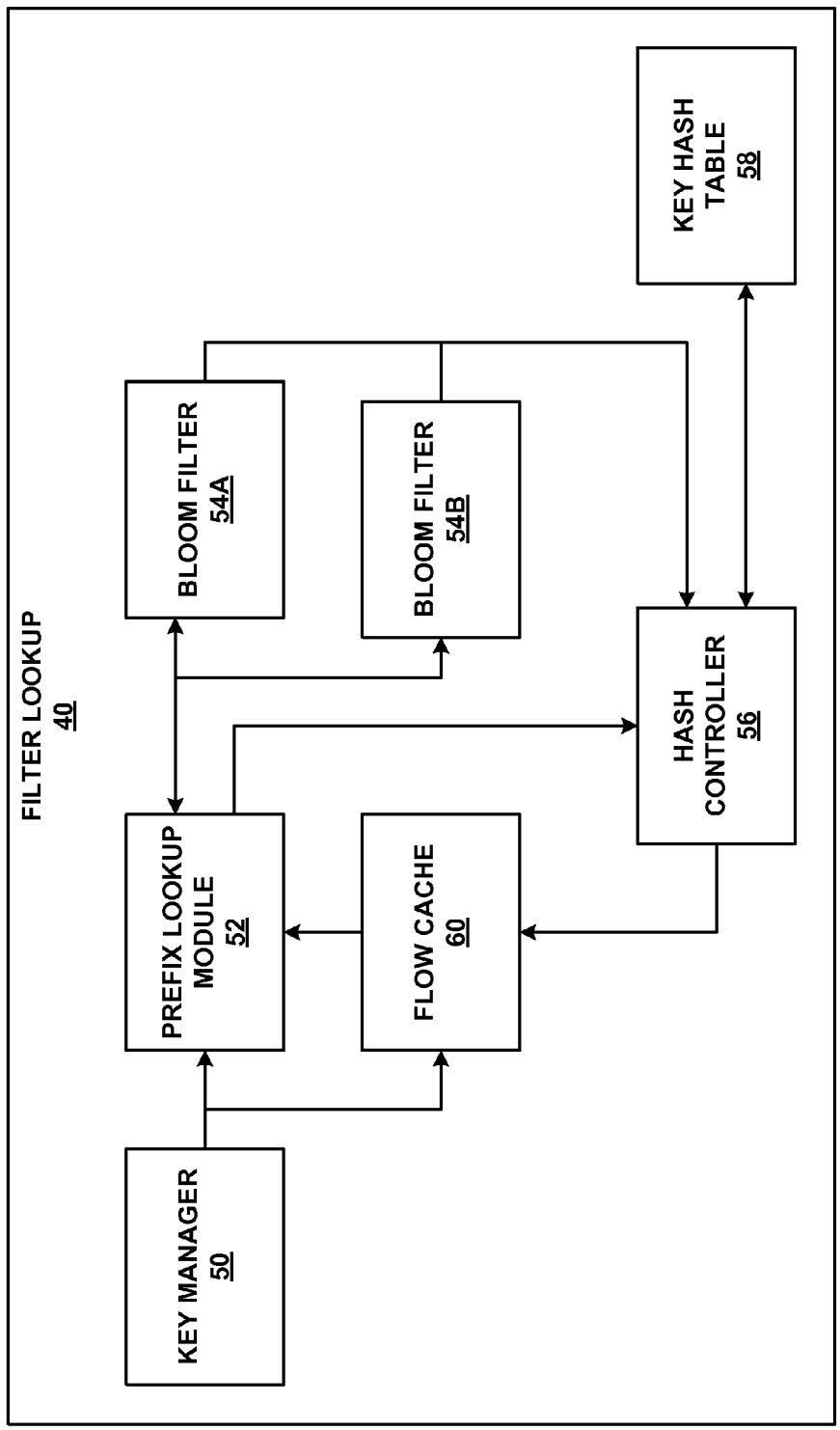
FIG. 3 is a block diagram illustrating an example filter lookup block of the router in greater detail.

FIG. 3 is a block diagram illustrating an example filter lookup block 40 of router 20 in greater detail. For purposes of illustration, filter lookup block 40 may be described below within the context of router 20 shown in the example of FIG. 2. In this example embodiment, filter lookup block 40 includes key manager 50, prefix lookup module 52, Bloom filters 54A and 54B (collectively, "Bloom filters 54"), hash controller 56, key hash table 58, and flow cache 60. The entries of prefix lookup module 52, Bloom filters 54, key hash table 58, and flow cache 60 may be configured based on input received from an administrator interacting with router 20. For example, if the administrator configures a new filter on router 20, filter lookup block 40 stores one or more prefixes associated with the filter within key hash table 58 and adds entries in each of Bloom filters 54 to indicate that there are corresponding matching entries in key hash table 58 for the prefixes.

In general, when router 20 receives a packet, at least a portion of the information included in the packet is sent to filter lookup block 40. In one example, the source or destination network address included in the packet is sent to filter lookup block 40. Key manager 50 receives the information and generates a lookup key based on the information. In some examples, the lookup key includes the destination network address included in the packet. In other examples, the lookup key may include any combination of the source network address, the destination network address, and the port number included in header information of the packet. Key manager 50 sends a command and the lookup key to flow cache 60 to cause flow cache 60 to perform a lookup on the lookup key. In some examples, key manager 50 sends the lookup key to prefix lookup module 52 in parallel to sending the lookup key to flow cache 60.

If flow cache 60 finds a match for the lookup key in a hash table of flow cache 60, flow cache 60 retrieves the stored result information associated with the lookup key and sends the result information to prefix lookup module 52. If flow cache 60 does not find a match for the key, flow cache 60 sends a message to prefix lookup module 52 indicating that a match was not found.

Prefix lookup module 52 processes the lookup key based at least in part on the result received from flow cache 60. For example, when flow cache 60 finds a match and sends the stored result information to prefix lookup module 52 as the result, prefix lookup module 52 does not generate a set of prefixes based on the lookup key. Instead, prefix lookup module 52 sends the result information received from flow cache 60 to hash controller 56.

When flow cache 60 does not find a match, prefix lookup module 52 sends a message to hash controller 56 that instructs hash controller 56 to initialize to zero at least a clock cycle counter for the lookup key and generates a set of prefixes using the lookup key. The number and the lengths of the prefixes generated from the lookup key are specified in prefix lookup module 52. The clock cycle counter increments for each clock cycle that elapses between when the clock cycle counter begins and when a match is found in key hash table 58 or it is determined that no match for the lookup key is located in key hash table 58 (e.g., because none of the prefixes generated from the lookup key were found in key hash table 58). In some examples, the clock cycle counter starts when prefix lookup module 52 sends the generated set of prefixes to Bloom filters 54.

After generating the set of prefixes specified in prefix lookup module 52, filter block 40 performs a lookup for the one or more of the generated prefixes in each of Bloom filters 54. That is, the full set of generated prefixes is looked up in Bloom filter 54A and in Bloom filter 54B. For each prefix looked up in each Bloom filter 54, a value is returned indicating whether the prefix was found in the respective Bloom filter 54. In one example, the value one indicates that the prefix was found and the value zero indicates that the prefix was not found. While shown in FIG. 3 as including two Bloom filters 54A and 54B, other examples of filter lookup block 40 may include one Bloom filter or more than two Bloom filters.

Hash controller 56 determines whether to perform a lookup in key hash table 58 for each prefix. Hash controller 56 examines the value returned from the Bloom filter lookup for each of the prefixes and identifies the longest prefix that may be included in key hash table 58. If both values returned from the lookups performed in Bloom filters 54A and 54B indicate that the prefix may be included in key hash table 58, hash controller 56 determines that the prefix may be included in key hash table 58. If either value returned from the lookups performed in Bloom filter tables 54A and 54B indicates that the prefix is not included in key hash table 58, hash controller determines that the prefix is not included in key hash table 58. The likelihood of getting a false positive result for a single prefix from both Bloom filters is lower than if only one Bloom filter is used. Because hash controller 56 considers performing a lookup for a prefix in key hash table 58 only when the return values from both of Bloom filters 54 indicate that the prefix may be in the set, the number of unneeded or unsuccessful lookups performed on key hash table 58 may be reduced when two Bloom filters are used as compared to when one Bloom filter is used.

When hash controller 56 identifies at least one prefix that may be included in key hash table 58, hash controller 56 initializes a counter that counts the number of lookups that are performed in key hash table 58 until an outcome has been determined. Hash controller 56 identifies the longest prefix that may be in key hash table 58, performs a lookup in key hash table 58 using the identified prefix, and increments the key hash table lookup counter. When hash controller 56 performs the lookup, hash controller 56 applies a hash function to the prefix in order to identify the location in key hash table 58 at which the prefix should be located if the prefix is stored in key hash table 58. If the prefix is not found in key hash table 58 (e.g., because of a false positive indication received from the Bloom filter), hash controller 56 identifies the next longest prefix that may be in key hash table 58, performs a lookup in key hash table 58 using the next longest prefix, and increments the key hash table lookup counter. This process continues until a prefix is found in key hash table 58 or there are no more prefixes to lookup in key hash table 58.

When a match is found or there are no more prefixes to lookup in key hash table 58, hash controller 56 stops the clock cycle counter. Hash controller 56 sends the value of the clock cycle counter, the value of the key hash table lookup counter, the lookup key, and the result associated with the lookup key to flow cache 60. The result associated with the lookup key includes the information returned from the lookup in key hash table 58 when a match was found or an indication that the lookup key is not found in key hash table 58 when a match was not found.

Flow cache 60 determines if the value of the clock cycle counter is greater than a configurable threshold or if the value of the key hash table lookup counter is greater than another configurable threshold. In examples where the value of the clock cycle counter is greater than the configurable threshold or where the value of the key hash table lookup counter is greater than the other configurable threshold, flow cache 60 identifies the lookup key as being eligible for storage in flow cache 60.

For packet flows that are eligible for storage in flow cache 60, flow cache 60 determines where to store the lookup key and result by at least applying a hash function to the lookup key. The hash result corresponds to a location (e.g., a bucket) within the hash table of flow cache 60. In one example, flow cache 60 is implemented as a hash table having 512 buckets each with 2 cells per bucket. The combination of the lookup key and the associated result consumes one cell. Thus, in this example, each bucket may store information about two packet flows and flow cache 60 may store information about 1024 packet flows.

In some instances, a lookup key and associated result may already be stored in one or both of the cells that correspond to the bucket identified by the hash result. Flow cache 60 may be programmatically configured to select which cell to store the lookup key and associated result using any number of different algorithms including random eviction and least recently used. In examples where flow cache 60 is programmed to use random eviction, flow cache 60 may include a shift register that generates a random number (e.g., a zero or a one) that corresponds to one of the two cells of the hash bucket. Flow cache 60 stores the lookup key and associated result in the cell that corresponds to the generated random number. In examples where flow cache 60 is programmed to use a least recently used algorithm to select the cell to store the lookup key and associated result, flow cache 60 maintains access information and marks cells as eligible to be replaced based on when the cell was last accessed. Flow cache 60 identifies the cell of the bucket that includes information that was least recently accessed or used by flow cache 60 and stores the new lookup key and associated result in the identified cell.

Figure 4:
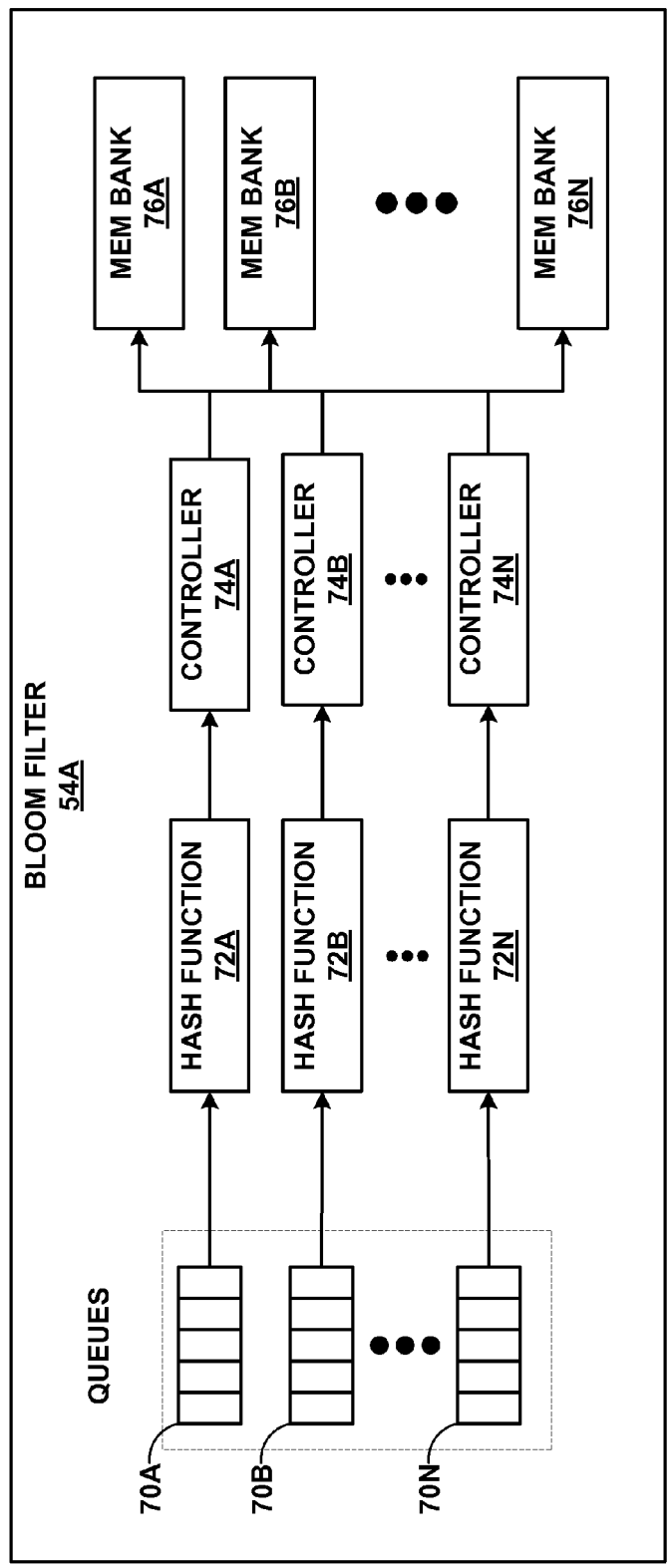
FIG. 4 is a block diagram illustrating an example Bloom filter of the router in greater detail.

FIG. 4 is a block diagram illustrating an example Bloom filter 54A of router 20 in greater detail. For purposes of illustration, Bloom filter 54A may be described below within the context of filter lookup block 40 shown in the example of FIG. 3 and router 20 shown in the example of FIG. 2. Bloom filter 54A is one example of a Bloom filter of router 20. In other examples, router 20 may include Bloom filters having a different configuration. Bloom filter 54A includes queues 70A-70N (collectively, "queues 70"), hash functions 72A-72N (collectively, "hash functions 72"), controllers 74A-74N

(collectively, "controllers 74"), and memory banks (MEM BANK) 76A-76N (collectively, "memory banks 76").

Each of memory banks 76 is a separate hardware bank of memory that may each be accessed in parallel with other ones of memory banks 76. The data structure of Bloom filter 54A is stored in memory banks 76 such that the values indicating whether a prefix was likely stored in key hash table 58 or definitely not stored in key hash table 58 are stored across memory banks 76 based on the results of applying a hash function to each prefix associated with a filter. In one example, the number of memory banks 76 is the same as the number of queues 70. In another example, the number of memory banks 76 is greater than the number of queues 70 (e.g., 32 memory banks when there are 16 queues). By having more memory banks 76 than queues 70, the values may be spread across more memory banks, thus reducing the likelihood that two different prefixes will require lookups from the same one of memory banks 76. Reducing the number of prefixes that require lookups from the same one of memory banks 76 may increase the parallelism of the lookup operation and may decrease the buildup of prefixes in one or more of queues 70.

Bloom filter 54A receives a set of prefixes from prefix lookup module 52 and temporarily stores the prefixes in queues 70. Each of queues 70 is configured to store prefixes of a certain length. In one example, queues 70 includes sixteen queues where each queue is configured to store one of sixteen different length prefixes included in the set of prefixes received from prefix lookup module 52. For example, queue 70A may be configured to store the longest prefix length from a set of sixteen prefix lengths (e.g., prefixes of length /32), queue 70B may be configured to store the second longest prefix length from the set of sixteen prefix lengths (e.g., prefixes of length /24), and queue 70N may be configured to store the shortest prefix length from the set of sixteen prefix lengths (e.g., prefixes of length /2). While illustrated as each of queues 70 having five "slots" for storing prefixes, queues 70 may be configured with any amount of storage (e.g., any number of bytes) capable of having any number of "slots" for storing prefixes (e.g., four, eight, or twelve slots). The number of slots, in various instances, is equal to the initial value of the corresponding credit counter of prefix lookup module 52.

When Bloom filter 54A performs a lookup, Bloom filter 54A removes a set of prefixes from queues 70. In one example, queues 70 are configured as first-in-first-out queues such that when Bloom filter 54A removes a prefix from one of queues 70, Bloom filter 54A removes the prefix that was first added to the queue (i.e., the prefix that was in the queue for the longest period of time). Upon removing a prefix from each of queues 70, Bloom filter 54A applies a respective one of hash functions 72 to the prefix to generate a location within memory banks 76 (e.g., a memory address) in which to look for the prefix. Hash functions 72 may be implemented in hardware such that hash functions 72 include N different hardware implementations of the same hash function. In some examples, the number of hardware-implemented hash functions equals the number of queues 70.

Each of hash functions 72 are the same hash function within a single Bloom filter, but may be different between Bloom filters. For example, the hash functions implemented in Bloom filter 54A may be different than the hash functions implemented in Bloom filter in 54B. By implementing different hash functions in different Bloom filters, the likelihood that all of the Bloom filters will return a false positive is reduced as compared to implementing one hash function in multiple Bloom filters. By implementing one hash function 72 in hardware for each of queues 70, hash functions 72 may hash each of the set of prefixes in parallel.

The value generated by hashing the prefix is the index for the Bloom filter. The index is passed to the respective one of controllers 74. The index serves as a memory address. Controllers 74 perform a read from a memory bank 76 based on the index. In one example, controllers 74 examine the first five bits of the index to determine which one of memory banks 76 to use for the lookup. Controllers 74 may also be implemented in hardware and the number of controllers 74 may be the same as the number of queues 70. By implementing controllers 74 in hardware and implementing the same number of controllers 74 as the number of queues 70, controllers 74 may determine the appropriate one of memory banks 76 in which to perform the read from a memory bank 76 for the index value for each of the set of prefixes in parallel.

In some instances, two or more prefixes of a single set of prefixes may require a lookup in the same one of memory banks 76. In these instances, one lookup is typically performed on the one memory bank 76 in one clock cycle and the second lookup on the one memory bank 76 is performed in the next clock cycle. For example, if the first prefix is retrieved from queue 70A and the second prefix is retrieved from queue 70B and both prefixes require a lookup in memory bank 76B. In this example, controller 74A may perform a lookup on the first prefix in memory bank 76B in a first clock cycle and controller 74B may perform a lookup on the second prefix in memory bank 76B in the second clock cycle.

During the second clock cycle, Bloom filter 54A may retrieve another prefix from queue 70A because a lookup was performed on the previously retrieved prefix. In this manner, the lengths of each of queues 70 may be different. During the second clock cycle, prefix lookup module 52 may send an additional set of prefixes to Bloom filter 54A, which are then stored in queues 70. If several prefixes require a lookup from the same one of memory banks 76, one or more of queues 70 may fill up (i.e., hot banking).

After a lookup is performed by each of controllers 74, controllers 74 sends the result of the lookup to hash controller 56 of filter lookup block 40. For example, when controller 74A completes a lookup for a prefix retrieved from queue 70A, controller 74A sends the result of the lookup to hash controller 56. The result of the lookup indicates whether the prefix is likely stored in key hash table 58 or is definitely not stored in key hash table 58.

Figure 5:
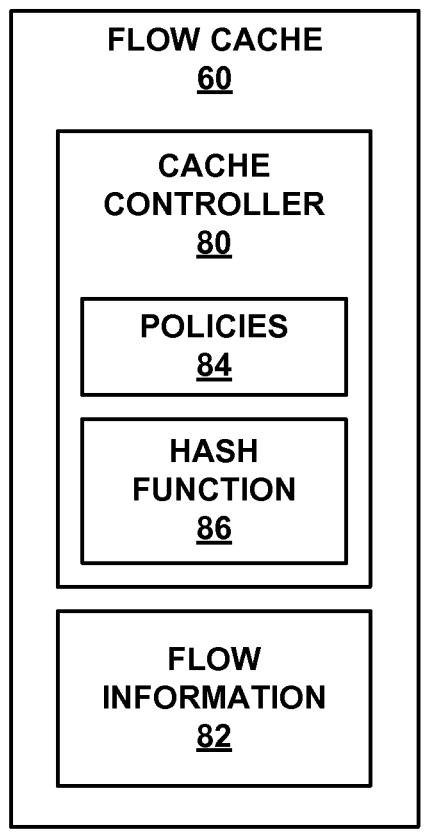
FIG. 5 is a block diagram illustrating an example flow cache of the router in greater detail.

FIG. 5 is a block diagram illustrating an example flow cache 60 of router 20 in greater detail. For purposes of illustration, flow cache 60 may be described below within the context of filter lookup block 40 shown in the example of FIG. 3 and router 20 shown in the example of FIG. 2. Flow cache 60 is one example of a flow cache of router 20. Flow cache 60 includes cache controller 80 and flow information 82. Cache controller 80 further includes policies 84 and hash function 86.

Flow cache 60 is programmable (e.g., by control plane 32 of router 20) to configure policies 84 that cache controller 80 applies to lookup keys to determine if the packet flow associated with a lookup key is eligible for storage within flow cache 60. Policies 84 include the threshold values used to determine whether a lookup key is eligible for storage within flow cache 60 and may also include configuration information that identifies the replacement algorithm to use when storing a lookup key and its associated result in flow information 82. In some examples, filter lookup block 40 outputs statistical information (e.g., throughput, cache hits, etc.) to control plane 32. Control plane 32 may automatically adjust the thresholds stored in policies 84 based at least in part on the statistical information received from flow cache 60.

Upon receiving a lookup key and associated result from hash controller 56, cache controller 80 determines whether the lookup key and associated result are eligible for storage within flow information 82. As described above, hash controller 56 maintains a clock cycle counter and a key hash table lookup counter and sends the value of each counter to flow cache 60. Cache controller 80 retrieves threshold values for each counter from policies 84 and determines whether the value of either counter exceeds the respective threshold value. When neither of the values of the counters exceeds a respective threshold value, cache controller 80 discards the lookup key and associated result without storing the lookup key and associated result in flow information 82.

When the value of either counter exceeds a respective threshold value, cache controller 80 marks the lookup key and associated result as being eligible for storage in flow information 82. Cache controller 80 applies hash function 86 to the lookup key to generate a location within flow information 82 in which to store the lookup key and associated result. Flow information 82 may be implemented as a hardware hash table that includes 512 buckets each having two cells. Each cell stores a lookup key and associated result for a packet flow. In one example, the lookup key is the destination network address of the packet flow that is included in header information of each packet of the packet flow. The location generated by applying hash function 86 to the lookup key corresponds to one of the buckets included in flow information 82. Cache controller 80 stores the lookup key and the associated result in one of the two cells of the identified bucket.

If both cells of the bucket include previously stored information, cache controller 80 may select which cell will be overwritten with the lookup key and associated result. In one example, cache controller 80 uses a random eviction algorithm by at least generating a random number and storing the lookup key and associated result in the cell that corresponds to the generated random number (e.g., a zero corresponds to a first cell and a one corresponds to a second cell). In another example, cache controller 80 uses a least recently used algorithm by at least maintaining state information about each cell and storing the lookup key and associated result in the cell that includes information that was the least recently used. While described in the context of a bucket having two cells, the techniques described above may also be applied to a bucket having any number of cells (e.g., four, ten, or fifty).

Flow cache 60 also receives lookup keys from key manager 50. When router 20 receives a packet that needs to be processed by filter lookup block 40, key manager 50 receives network address information included in the packet and passes at least a portion of the network address information to flow cache 60. In some examples, the network address information passed to flow cache 60 is the destination network address for the packet. In general, the network address information sent to flow cache 60 by key manager 50 corresponds to the lookup key stored in flow information 82.

Cache controller 80 applies hash function 86 to the received network address information to identify a location within flow information 82 and performs a lookup at the location. If no match for the received network address is found at either cell of the bucket associated with the location, cache controller 80 determines that information for the packet flow is not stored within flow cache 60 and sends a message to prefix lookup module 52 indicating that a match was not found. If a match for the received address is found, cache controller 80 retrieves the lookup key and associated result from flow information 82 and outputs the lookup key and associated result to prefix lookup module 52.

Cache controller 80 may be configured to flush the information stored in flow information 82. If, for example, control plane 32 changes a route associated with a packet flow, control plane 32 may send flow cache 60 a command that causes cache controller 80 to flush the information stored in flow information 82. By flushing the information stored in flow information 82, flow cache 60 automatically starts relearning information about packet flows identified as being eligible for storage in flow cache 60.

Figure 6A:
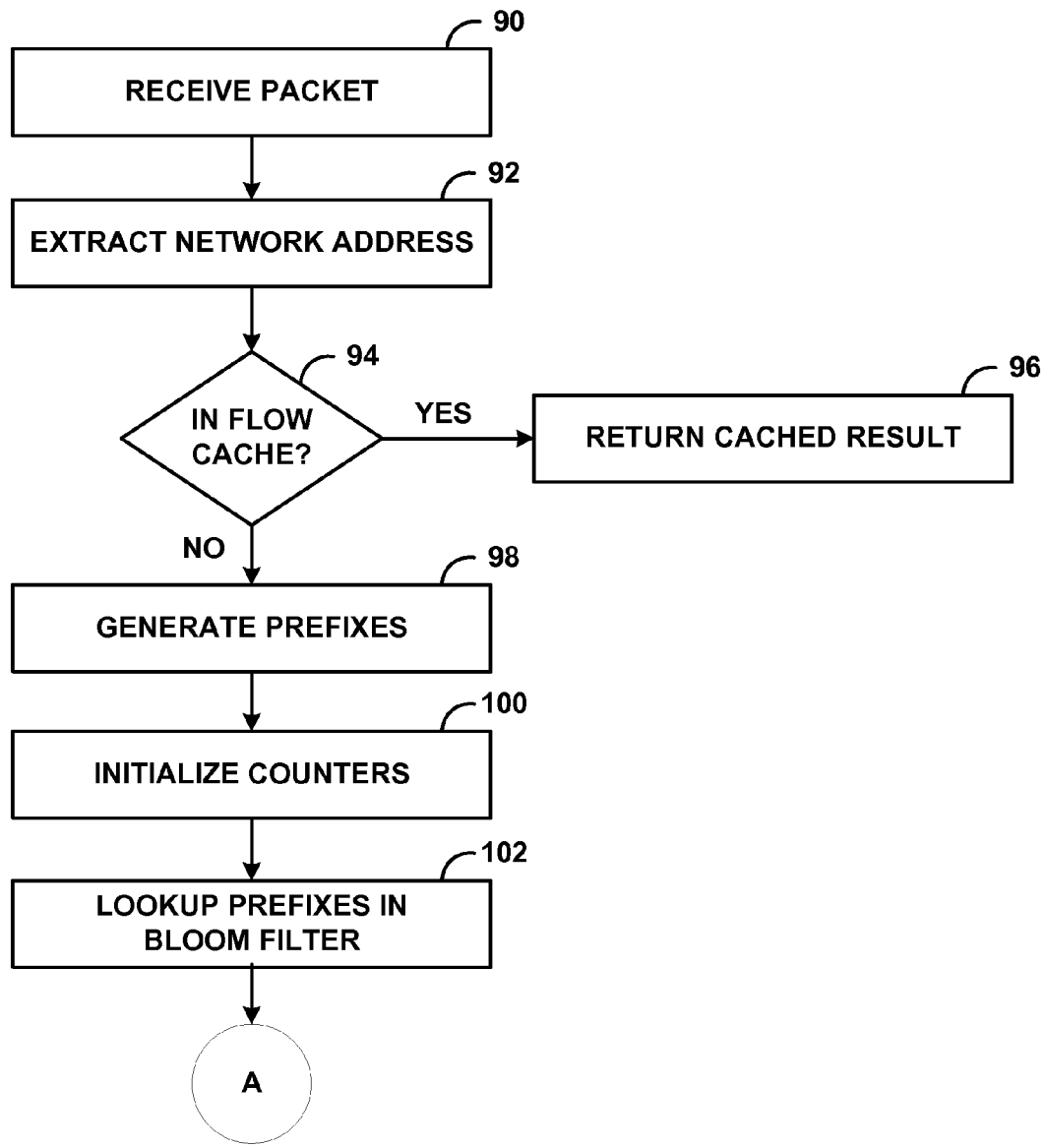
FIGS. 6A and 6B are flowcharts illustrating an example method for performing a lookup in accordance with one or more techniques of this disclosure.
Figure 6B:
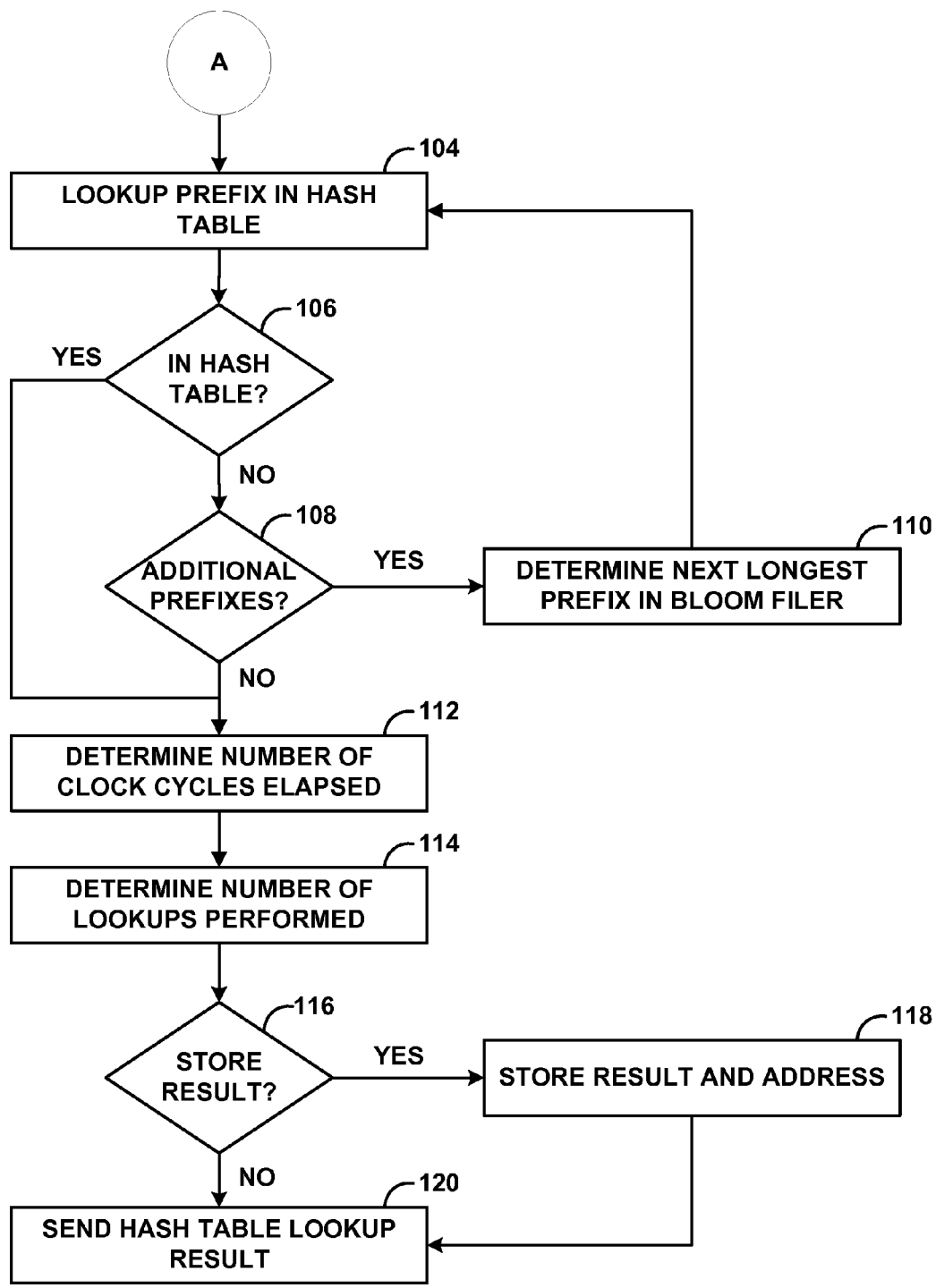

FIGS. 6A and 6B are flowcharts illustrating an example method for performing a lookup in accordance with one or more techniques of this disclosure. For purposes of clarity, the method shown in FIGS. 6A and 6B will be described with respect to system 2 of FIG. 1, router 20 of FIG. 2, filter lookup block 40 of FIG. 3, and flow cache 60 of FIG. 5. Router 20 receives a packet via one of IFCs 24 and inbound links 26 from a device (e.g., client device 14 of FIG. 1) (90). Data plane 34 extracts information from the packet (92) and sends the key information to filter lookup block 40. In some examples, the information is extracted from a header of the packet and may include a source or destination network address, a source or destination port, or a protocol.

Key manager 50 of filter lookup block 40 of router 20 receives the information, generates a lookup key based on the information, and sends the lookup key to flow cache 60 to determine whether the lookup key is located in flow cache 60 (94). Flow cache 60 performs a lookup within flow information 82 to determine whether information about the packet flow identified by the lookup key is stored within flow cache 60. If a match for the lookup key is found in flow information 82 ("YES" branch of 94), flow cache 60 outputs the lookup key and associated result to prefix length module 52 which, in turn, outputs the information to hash controller 56 for output to control plane 32 or data plane 34 (96). That is, when a match is found, filter lookup block 40 returns the cached result information to the appropriate hardware or software element of router 20.

If a match for the lookup key is not found in flow information 82 ("NO" branch of 94), prefix length module 52 generates a set of prefixes based at least in part on the lookup key generated by key manager 50 (98). The number and the lengths of the prefixes generated from the lookup key are specified in prefix lookup module 52. In one example, the prefix information stored in prefix lookup module 52 indicates that sixteen prefixes should be generated for a 32-bit IP address and the prefix lengths should be /2, /4, /6, /8, /10, continuing to /32. When generating the prefixes from the key information, prefix lookup module 52 masks a number of bits of the lower portion of the key information based on the prefix length. For example, if the prefix length is /8 and the key information is the 32-bit IP address 192.168.1.43, the prefix is 192/8 as the lower 24 bits of the IP address are masked with zeros. If the prefix length is /24, the prefix is 192.168.1/24.

Prefix length module 52 sends a message to hash controller 56 to initialize a clock cycle counter for the lookup key (100) and sends the generated set of prefixes to each of Bloom filters 54 for lookup (102). The clock cycle counter is incremented for each clock cycle that elapses between when the clock cycle counter is initialized and when a key hash table lookup result is obtained. Bloom filters 54 store each of the prefixes in a respective queue and, when performing a lookup, remove a prefix from each queue and apply one of hash functions 72 to the prefix to generate an index for the data structure of the Bloom filter 54 (102). The index, in one example, is a memory address of a location in a memory bank of the Bloom filter.

Each of Bloom filters 54 implements a different hash function that is independent from the hash function implemented in the other Bloom filter 54. Using different hash functions may reduce the likelihood that a queue corresponding to the same prefix length is full in both Bloom filters 54. After the prefix is looked up in memory banks 76, Bloom filter 54A sends the result of the lookup to hash controller 56.

Once hash controller 56 has received a lookup result for each of the prefixes generated from the key information and for each of the Bloom filters 54, hash controller 56 determines the longest prefix of the prefixes that were indicated as being found in both Bloom filters 54. If either Bloom filter lookup result for a prefix indicates that the prefix was not found in the Bloom filter, the prefix is not in key hash table 58 and hash controller 56 discards the prefix from consideration. Hash controller 56 then performs a lookup on the longest prefix in key hash table 58 (104) and determines whether the longest prefix was found in key hash table 58 (106). Hash controller 56 maintains a key hash table lookup counter that counts the number of lookups in key hash table 58 that are performed for a particular lookup key before a result is obtained. If the longest prefix is not found in key hash table 58 ("NO" branch of 106), hash controller 56 increments the key hash table lookup counter and determines whether there are any additional prefixes to lookup in key hash table 58 (108). If there are additional prefixes to lookup ("YES" branch of 108), has controller 56 determines the next longest prefix that was indicated as being found in both Bloom filters 54 (110) and performs a lookup in key hash table 58 using the next longest prefix (104) to determine if the next longest prefix is found in key hash table 58 (106). Controller 56 continues determining the next longest prefix (110), incrementing the key hash table lookup counter, and performing a lookup in key hash table 58 (104) until the prefix is found in key hash table 58 ("YES" branch of 106) or until all possible prefixes are looked up in key hash table 58 ("NO" branch of 108).

Controller 56 retrieves the values from the clock cycle counter and the key hash table lookup counter to determine how many clock cycles elapsed since prefix lookup module 52 began processing the key information (112) and determine how many lookups in key hash table 58 were performed (114). Controller 56 sends the lookup key, the associated result obtained from key hash table 58, the value of the clock cycle counter, and the value of the key hash table counter to flow cache 60.

Cache controller 80 of flow cache 60 applies policies 84 to the value of the clock cycle counter and the value of the key hash table lookup counter to determine whether the packet flow is eligible for storage within flow cache 60 (116). Policies 84 includes a configurable threshold value for the clock cycle counter and a configurable threshold value for the key hash table lookup counter. If the value of the clock cycle counter is greater than the corresponding threshold value or if the value of the key hash table lookup counter is greater than the corresponding threshold value, cache controller 80 identifies the packet flow as being eligible for storage in flow information 82 ("YES" branch of 116) and stores the lookup key and associated result in flow information 82 (118). If the value of the clock cycle counter is not greater than the corresponding threshold value and if the value of the key hash table lookup counter is not greater than the corresponding threshold value, cache controller 80 identifies the packet flow as not being eligible for storage in flow cache 60 ("NO" branch of 116). In either instance, hash controller 56 outputs the key hash table lookup result to data plane 34 (120).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the invention have been described. These and other embodiments are within the scope of the following claims.

What is claimed is:
1. A method comprising:
  receiving, with a network device, a packet of a packet flow, wherein the packet flow is one of a plurality of packet flows processed by the network device;
  processing, with a filter block of the network device, a lookup key associated with the packet to determine whether a prefix associated with the lookup key is stored in a hash table of the filter block, wherein processing the lookup key comprises:
    processing, with a Bloom filter of the network device, at least one prefix associated with the lookup key to identify one or more prefixes to use in searching the hash table, wherein the Bloom filter stores indications of whether various prefixes associated with the plurality of packet flows processed by the network device are stored in the hash table; and
    searching the hash table using at least one of the identified one or more prefixes, wherein the hash table stores a plurality of key value and prefix pairs for at least a first portion of the plurality of packet flows processed by the network device; and responsive to determining, with the network device, that a duration required to process the lookup key is greater than a threshold duration, storing information about the packet flow in a flow cache of the filter block, wherein the flow cache stores information about a second portion of the plurality of packet flows processed by the network device.

2. The method of claim 1, further comprising:
responsive to determining, with the filter block and based on the lookup key, that information about the packet flow is stored in the flow cache:
retrieving, with the filter block, the stored result from the flow cache; and
outputting the stored result.

3. The method of claim 1, further comprising:
sending, from a prefix lookup module of the filter block and to the Bloom filter, the at least one prefix for processing with the Bloom filter;
initializing, with a controller of the filter block, a clock cycle counter to a value; and
incrementing, with the controller, the value of the clock cycle counter for each clock cycle that elapses until the controller receives a result from the search of the hash table,
wherein determining that the duration required to process the lookup key is greater than the threshold duration comprises: determining that the value of the clock cycle counter exceeds a threshold value.

4. The method of claim 1, wherein storing information about the packet flow in the flow cache comprises:
applying a hash function to the lookup key in order to identify a location within the flow cache, wherein the location includes a plurality of cells, and wherein each of the plurality of cells is configured to store a respective lookup key and result pair;
determining whether all of the plurality of cells of the location currently store previous lookup key and result pairs;
when all of the plurality of cells currently store previous lookup key and result pairs, selecting one of the plurality of cells to store the lookup key and the result; and
overwriting the selected one of the plurality of cells with the lookup key and the result.

5. The method of claim 4, wherein selecting one of the plurality of cells to store the lookup key and the result comprises:
generating a random number; and
selecting the one of the plurality of cells based on the generated random number.

6. The method of claim 4, wherein selecting one of the plurality of cells to store the lookup key and the result comprises:
retrieving session information for each of the plurality of cells;
determining which cell of the plurality of cells was least recently used based on the session information for each respective cell of the plurality of cells; and
selecting the one of the plurality of cells based on which cell was least recently used.

7. The method of claim 1, wherein searching the hash table further comprises:
initializing, with a controller of the filter lookup block, a lookup counter to a value;
selecting, with the controller, a first prefix of the identified one or more prefixes;

searching, with the controller and based on the first prefix, the hash table;
receiving a result of the search of the first prefix; and
when the result of the search of the first prefix indicates that a match was found in the hash table, sending, from the controller and to the flow cache, the lookup key, the result of the search of the first prefix, and the value of the lookup counter.

8. The method of claim 7, wherein determining that the duration required to process the lookup key is greater than the threshold duration comprises:
comparing, with the flow cache, the value of the lookup counter to a threshold value; and
determining that the duration required to process the lookup key is greater than the threshold duration when the value of the lookup counter is greater than the threshold value.

9. The method of claim 7, further comprising, when the result of the search of the first prefix indicates that a match was not found in the hash table:
incrementing the value of the lookup counter;
selecting a second prefix of the identified one or more prefixes, wherein the second prefix is different from the first prefix;
searching, with the controller and based on the second prefix, the hash table;
receiving a result of the search of the second prefix; and
when the result of the search of the second prefix indicates that a match was found in the hash table, sending, from the controller and to the flow cache, the lookup key, the result of the search of the second prefix, and the value of the lookup counter.

10. The method of claim 1, further comprising:
applying a hash function to the lookup key to generate a hash result;
identifying, based on the hash result, a location within a hash table of the flow cache;
retrieving a value stored at the identified location;
determining, with the filter block and based on a comparison of the value stored at the identified location and the value of the lookup key, whether the lookup key is stored in the flow cache.

11. A network device comprising:
one or more network interfaces configured to receive a packet of a packet flow, wherein the packet flow is one of a plurality of packet flows processed by the network device;
a filter block comprising:
a flow cache configured to store information about a second portion of the plurality of packet flows processed by the network device;
a hash table configured to store a plurality of key value and prefix pairs for at least a first portion of the plurality of packet flows processed by the network device; and
a Bloom filter configured to store indications of whether various prefixes associated with the plurality of packet flows processed by the network device are stored in the hash table,
wherein the filter block is configured to process a lookup key associated with the packet to determine whether a prefix associated with the lookup key is stored in the hash table by at least causing the Bloom filter to process at least one prefix associated with the lookup key to identify one or more prefixes to use in searching the hash table and searching the hash table using at least one of the identified one or more prefixes, and is further configured to, responsive to determining that a duration required to process the lookup key is greater than a threshold duration, store information about the packet flow in the flow cache.

12. The device of claim 11, wherein the filter block is configured to, responsive to determining, based on the lookup key, that information about the packet flow is stored in the flow cache: retrieve the stored result from the flow cache, and output the stored result.

13. The network device of claim 11, further comprising:
one or more processors;
a prefix lookup module executable by the one or more processors to receive the lookup key and generate, based on the lookup key, the at least one prefix ; and
a controller,
wherein the prefix lookup module is executable by the one or more processors to send the at least one prefix to the Bloom filter for processing by the Bloom filter, and send a message to the controller to cause the controller to start a clock cycle counter,
wherein the controller is configured to receive the message and initialize the clock cycle counter to a value, increment the value of the clock cycle counter for each clock cycle that elapses until the controller receives a result from the search of the hash table, and, responsive to receiving the result, send the lookup key, the result, and the value of the clock cycle counter to the flow cache, and
wherein the flow cache is configured to determine whether the value of the clock cycle counter exceeds a threshold value, and store the lookup key and the result when the value of the clock cycle counter exceeds the threshold value.

14. The network device of claim 11, wherein the flow cache includes:
a flow cache hash table having a plurality of buckets each having a plurality of cells, wherein each of the plurality of cells is configured to store a respective lookup key and result pair,
wherein the flow cache is configured to apply a hash function to the lookup key in order to identify one of the plurality of buckets of the flow cache hash table, determine whether all of the plurality of cells of the identified bucket currently store previous lookup key and result pairs, when all of the plurality of cells currently store previous lookup key and result pairs, select one of the plurality of cells to store the lookup key and the result, and overwrite the selected one of the plurality of cells with the lookup key and the result.

15. The network device of claim 14,
wherein the flow cache is configured to select one of the plurality of cells to store the lookup key and the result by at least being configured to generate a random number, and select the one of the plurality of cells based on the generated random number.

16. The network device of claim 14, wherein the flow cache is configured to select one of the plurality of cells to store the lookup key and the result by at least being configured to retrieve session information for each of the plurality of cells, determine which cell of the plurality of cells was least recently used based on the session information each respective cell of the plurality of cells, and select the one of the plurality of cells based on which cell was least recently used.

17. The network device of claim 11, wherein the filter block further comprises:
a controller configured to initialize a lookup counter to a value, select a first prefix of the identified one or more prefixes, search the hash table based on the first prefix, receive a result of the search of the first prefix, and, when the result of the search of the first prefix indicates that a match was found in the hash table, send the lookup key, the result of the search of the first prefix, and the value of the lookup counter to the flow cache.

18. The network device of claim 17,
wherein the filter block is configured to determine that the duration required to process the lookup key is greater than the threshold duration by at least being configured to compare the value of the lookup counter to a threshold value, and determining at the duration required to process the lookup key is greater than the threshold duration when the value of the lookup counter is greater than the threshold value.

19. The network device of claim 17,
wherein, when the result of the search of the first prefix indicates that a match was not found in the hash table, the controller is configured to increment the value of the lookup counter, select a second prefix of the identified one or more prefixes, wherein the second prefix is different from the first prefix, search the hash table based on the second prefix, receive a result of the search of the second prefix, and, when the result of the search of the second prefix indicates that a match was found in the hash table, send the lookup key, the result of the search of the second prefix, and the value of the lookup counter to the flow cache.

20. A non-transitory computer-readable storage medium encoded with instructions for causing one or more programmable processors of a computing device to:
receive a packet of a packet flow, wherein the packet flow is one of a plurality of packet flows processed by the computing device;
process a lookup key associated with the packet to determine whether a prefix associated with the lookup key is stored in a hash table of the filter block by at least causing a Bloom filter of the computing device to process at least one prefix associated with the lookup key to identify one or more prefixes to use in searching the hash table, wherein the Bloom filter stores indications of whether various prefixes associated with the plurality of packet flows processed by the network device are stored in the hash table and searching the hash table using at least one of the identified one or more prefixes, wherein the hash table stores a plurality of key value and prefix pairs for at least a first portion of the plurality of packet flows processed by the network device; and
responsive to determining that a duration required to process the lookup key is greater than a threshold duration, store information about the packet flow in a flow cache of the computing device, wherein the flow cache stores information about a second portion of the plurality of packet flows processed by the computing device.

* * * * *